(12) United States Patent
Winquist et al.

(10) Patent No.: US 9,344,440 B2
(45) Date of Patent: May 17, 2016

(54) FORCED ALERT THRESHOLDS FOR PROFILED DETECTION

(71) Applicant: Arbor Networks, Inc., Plano, TX (US)

(72) Inventors: James Edward Winquist, Plano, TX (US); Joseph Welch, Plano, TX (US); Tim Hoffman, Plano, TX (US); Olan Patrick Barnes, Plano, TX (US)

(73) Assignee: Arbor Networks, Inc., Burlington, MA (US)

( * ) Notice: Subject to any disclaimer, the term of this patent is extended or adjusted under 35 U.S.C. 154(b) by 116 days.

(21) Appl. No.: 13/922,947

(22) Filed: Jun. 20, 2013

(65) Prior Publication Data
US 2014/0380467 A1 Dec. 25, 2014

(51) Int. Cl.
H04L 29/06 (2006.01)

(52) U.S. Cl.
CPC .................................. *H04L 63/1408* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 5,922,051 A * | 7/1999 | Sidey | ........................... | 709/223 |
| 7,526,807 B2 * | 4/2009 | Chao et al. | ...................... | 726/23 |
| 7,788,718 B1 * | 8/2010 | Fei et al. | ........................ | 726/22 |
| 8,248,946 B2 * | 8/2012 | Chao et al. | ................ | 370/235.1 |
| 8,479,282 B2 * | 7/2013 | Hamada | .......................... | 726/22 |
| 8,707,419 B2 * | 4/2014 | Kurapati et al. | ................ | 726/13 |
| 8,879,388 B2 * | 11/2014 | Lund | ............................ | 370/235 |
| 2005/0111367 A1 * | 5/2005 | Jonathan Chao et al. | ..... | 370/235 |
| 2006/0191006 A1 * | 8/2006 | Satake et al. | ..................... | 726/22 |
| 2008/0028467 A1 * | 1/2008 | Kommareddy et al. | ........ | 726/23 |
| 2008/0052774 A1 * | 2/2008 | Chesla et al. | ................... | 726/13 |
| 2011/0255418 A1 * | 10/2011 | Van Greunen et al. | ........ | 370/242 |
| 2012/0216282 A1 * | 8/2012 | Pappu et al. | .................... | 726/23 |

* cited by examiner

*Primary Examiner* — Jeffrey Pwu
*Assistant Examiner* — William Corum, Jr.
(74) *Attorney, Agent, or Firm* — Locke Lord LLP; Scott D. Wofsy; Christopher J. Capelli

(57) ABSTRACT

A node in a communication network determines a data rate capacity of one or more nodes of the communication network and creates a single managed object grouping for each node of the one or more nodes having a same data rate capacity. The node establishes one or more static thresholds for the single managed object grouping based on the data rate capacity. The static thresholds are independent of a baseline condition of detected data rates at each node of the single managed object grouping. The node further detects a current rate of received data at each node of the single managed grouping and triggers at least one alert for each node of the single managed grouping when the current rate of the received data at a particular node exceeds the one or more static thresholds.

12 Claims, 6 Drawing Sheets

FORCED ALERT THRESHOLDS FOR PROFILED DETECTION

BACKGROUND

1. Field of the Invention

This present disclosure relates generally to the field of network security and, more specifically, to providing alerts when potential network attacks are detected.

2. Description of the Related Art

Internet Service Providers (ISPs) face ever increasing operational challenges. For example, ISPs balance supporting bandwidth intensive applications (Internet Protocol Television (IPTV), voice over Internet Protocol (VoIP), etc.) while also mitigating and protecting against bandwidth intensive network security threats. Maintaining operations that support bandwidth-intensive applications during potential network attacks proves difficult, at best. Despite attempts to mitigate network-wide threats before impact of critical business services and applications, a need still remains for improved detection of network threats.

SUMMARY

Disclosed are systems, methods and computer program products for detecting mitigating network threats via forced alert thresholds. In one example embodiment, a node in a communication network determines a data rate capacity of one or more nodes of a communication network and creates a single managed object grouping (e.g., in response to a user command or input) for each node of the one or more nodes having a same data rate capacity. The node further establishes one or more static thresholds (e.g., in response to a user command or input) for the single managed object grouping based on the data rate capacity. Notably, the static thresholds are independent of a baseline condition of detected data rates at each node of the single managed object grouping. Such baseline condition can be determined by the node based on data received by each node of the single managed grouping over a prescribed period of time. The node further detects a current rate of received data (e.g., a bit per second data rate and a packet per second data rate, etc.) at each node of the single managed grouping and triggers at least one alert for each node of the single managed grouping when the current rate of the received data at a particular node exceeds the one or more static thresholds. The node further adjusts the one or more static thresholds after the at least one alert is triggered.

In some embodiments, the node further performs a mitigation protocol when the alert is triggered. In certain other embodiments, the node compares the current rate of the received data at each node of the single managed grouping to at least one of the one or more static thresholds to yield a difference rate and assigns a severity to the at least one alert based on the difference rate when the at least one alert is triggered. Alternatively, in other embodiments, the node determines a time period the current rate of the received data at each node of the single managed grouping exceeds the one or more static thresholds and assigns a severity to the at least one alert based on the time period, when the at least one alert is triggered.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Figure 1:
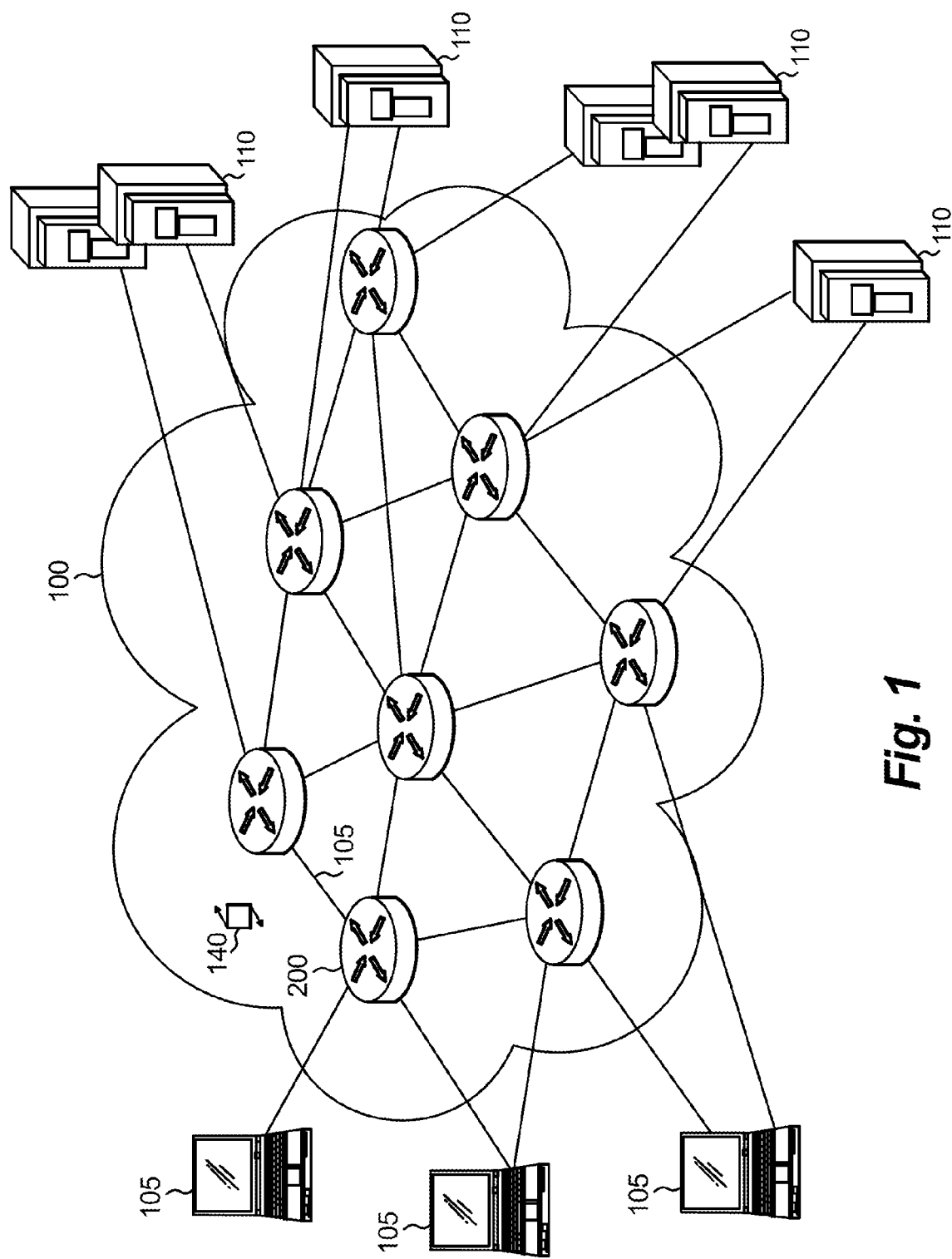
FIG. 1 illustrates a schematic block diagram of an example communication network illustratively comprising nodes/devices interconnected by various methods of communication or links.

FIG. 1 is a schematic block diagram of an example communication network 100 illustratively comprising nodes/devices 200 interconnected by various methods of communication or links 105. For instance, the links 105 may be wired links or may comprise a wireless communication medium, where certain nodes 200, such as, e.g., routers, switches, sensors, computers, network devices, etc., may be in communication with other nodes 200, e.g., based on distance, signal strength, current operational status, location, etc. Operatively, a client device 105 communicates data to/from servers or data centers 110 via network 100. In this fashion, client devices 105 can access data from particular servers/data centers 110. Those skilled in the art will understand that any number of nodes, devices, links, etc. may be used in the computer network, and that the view shown herein is for simplicity. Also, while the embodiments are shown herein illustrate particular connections between nodes, the description herein is not so limited, and various types of networks can be used, as is understood by those skilled in the art.

Figure 2:
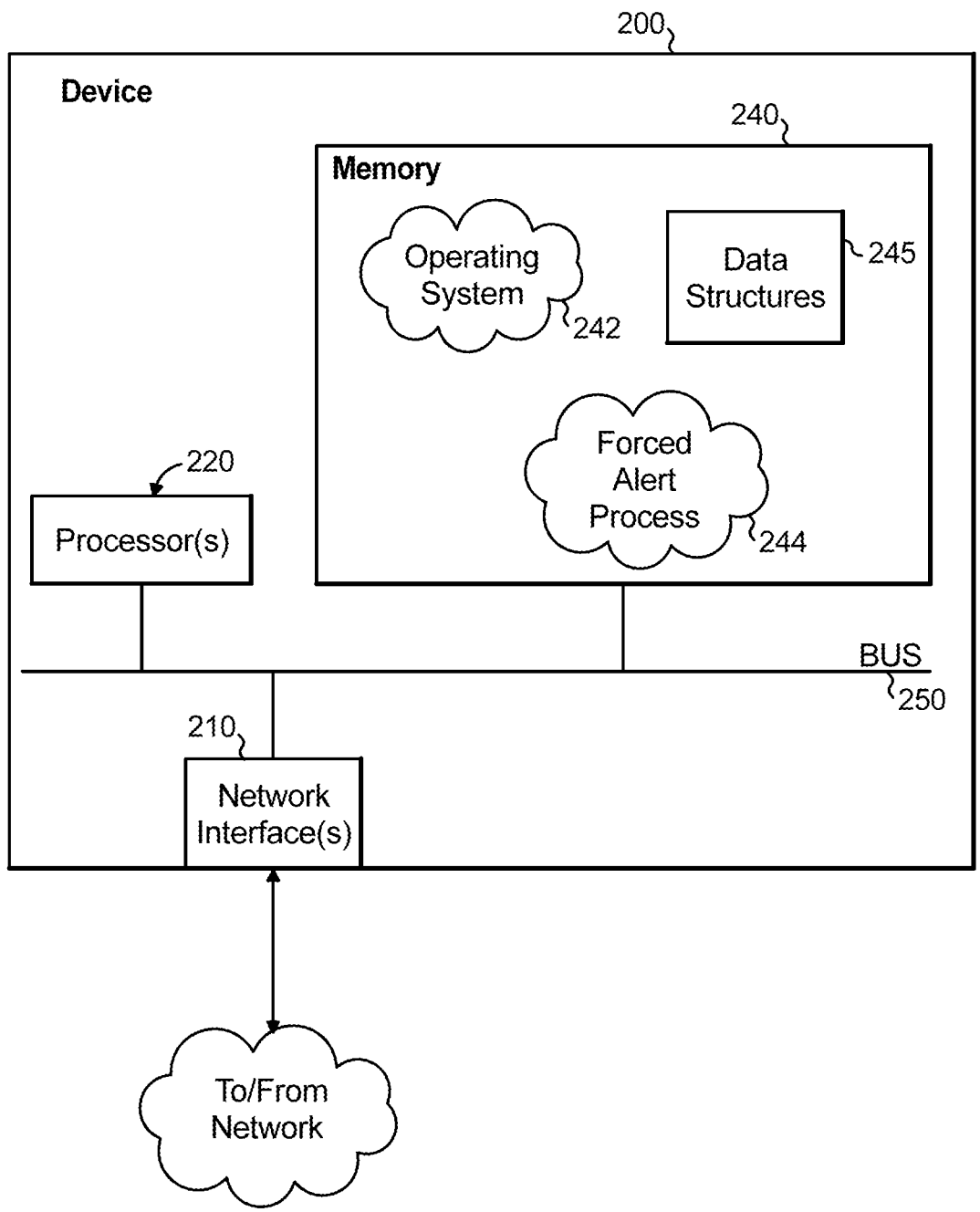
FIG. 2 illustrates a schematic block diagram of an example node/device that may be used with the communication network of FIG. 1.

FIG. 2 is a schematic block diagram of an example node/device 200 that may be used with one or more embodiments described herein, e.g., as one of the nodes in the communication network 100. The device may comprise one or more network interfaces 210, at least one processor 220, and a memory 240 interconnected by a system bus 250.

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®,), Ethernet, powerline communication (PLC) protocols, etc.

The memory 240 comprises a plurality of storage locations that are addressable by the processor 220 and the network interfaces 210 for storing software programs and data structures associated with the embodiments described herein. As noted above, certain devices may have limited memory or no memory (e.g., no memory for storage other than for programs/processes operating on the device). The processor 220 may comprise necessary elements or logic adapted to execute the software programs and manipulate data structures 245, such as routes or prefixes (notably on capable devices only). An operating system 242, portions of which are typically resident in memory 240 and executed by the processor, functionally organizes the device by, inter alia, invoking operations in support of software processes and/or services executing on the device. These software processes and/or services may comprise forced alert process/services 244.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the forced alert process 244, which may contain computer executable instructions executed by the processor 220 (or an independent processor of network interfaces 210) to perform functions relating to the techniques described herein.

As noted above, ISPs attempt to mitigate network-wide threats before impact of critical business services and applications. One example of one of these network-wide threats are bandwidth based attacks. For example, a Denial-of-Service (DoS) attack is a bandwidth based attack on a network system aimed at causing it to crash, i.e., to create conditions under which legitimate (rightful) system users cannot gain access to the resources (servers) provided by the system, or to make this access difficult. The motives for these attacks may vary—they may be elements of a competitive struggle, a means of fraud or retaliation, an expression of dissatisfaction, a demonstration of capabilities, or an attempt to attract attention, which is most often interpreted as cyber terrorism. Taken further, a DoS attack that is carried out simultaneously on a larger number of computers is called a Distributed Denial-of-Service (DDoS) attack. Since network routers, servers and firewalls have limited processing resources, they may become inaccessible for processing legitimate transactions or crash under the overload during DoS and DDoS bandwidth attacks, in which a large number of TCP, UDP or ICMP packets are sent to a specific network device or service. For example, referring again to FIG. 1, one or more client devices 105 can flood the nodes 200 of network 100 with repetitive data requests, which may cause such nodes and/or data centers/servers handling such requests to crash due to a bandwidth overload.

Attempts to mitigate and protect against network threats can include establishing a baseline profile for one or more conditions of a network (e.g., a particular data rate), detecting network behavior aberrant from the baseline profile, and performing threat mitigation techniques such as quarantining particular network resources, re-routing certain traffic/data, etc. Typically, baseline profiles are dynamic in nature and adjusted constantly (and automatically) over time as network conditions change. However, such dynamic profiles are susceptible to certain evasive network threats. For example, a network attack can slowly increase traffic or data rates over time so as to incrementally adjust a corresponding baseline profile thus avoiding detection.

Figure 3:
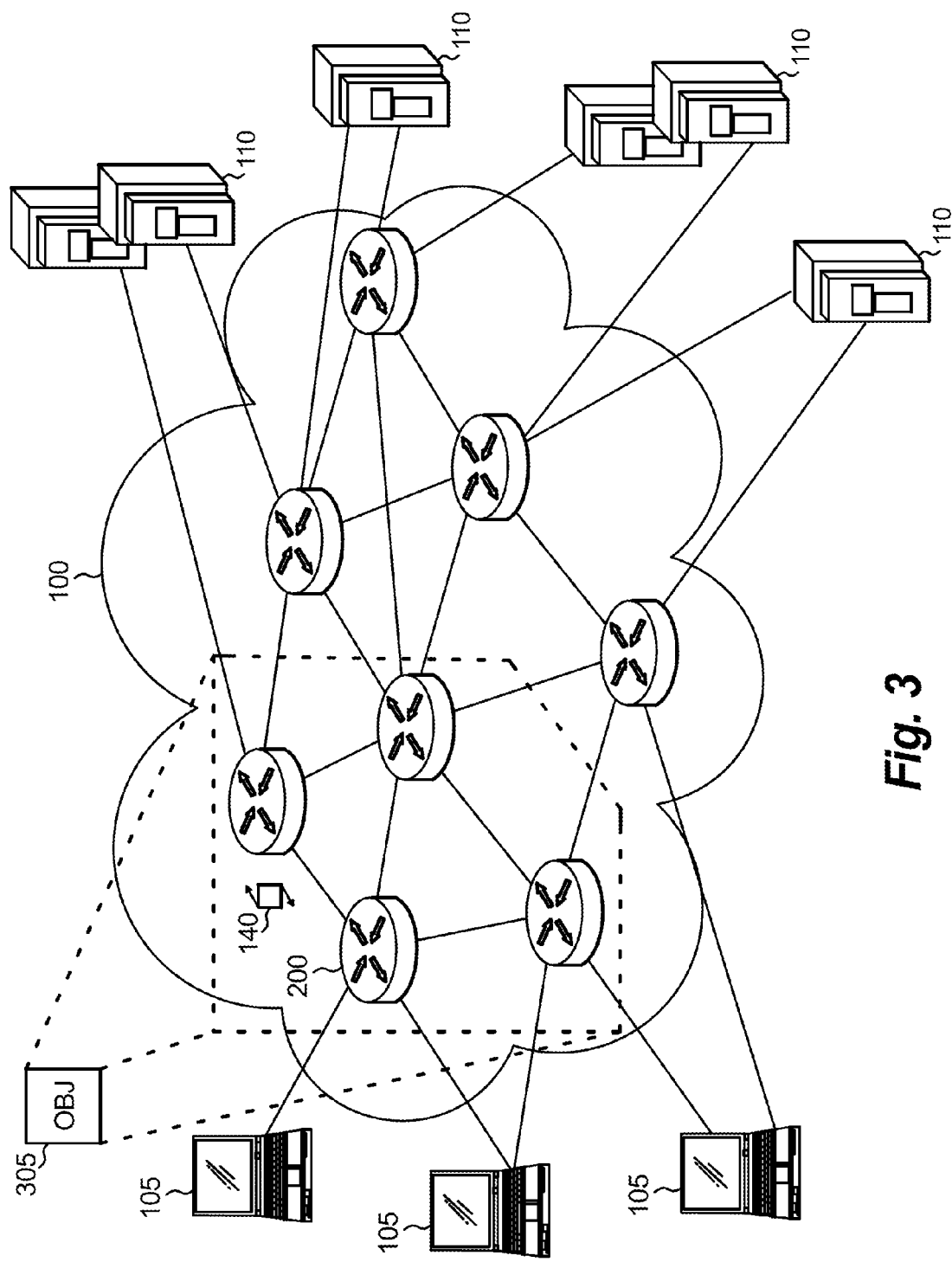
FIG. 3 illustrates various nodes in the communication network grouped into a single managed data object.

FIG. 3 illustrates various nodes in the communication network 100 grouped into a single managed data object 305. In particular, one or more nodes 200 are grouped according to a data capacity into the single managed group object 305. Such grouping facilitates forced alert process 244, as discussed herein. Notably, the nodes 200 of the single managed data object 305 can be grouped, for example, according to similar network interfaces. That is, each of the grouped nodes can include the same network interfaces such as data ports, processing capacity, etc.

Figure 4A:
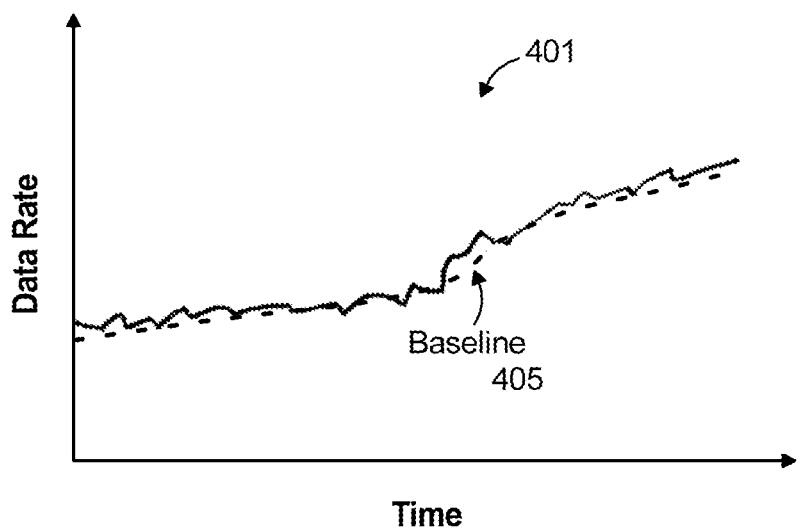
FIG. 4A illustrates a graph showing a data rate (e.g., bits/second, bytes/second, packets/second, etc.) as a function of time.
Figure 4B:
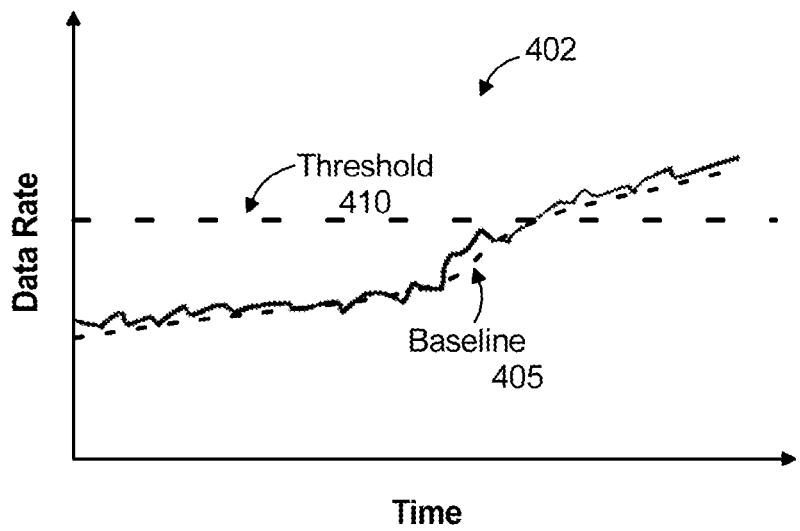
FIG. 4B illustrates graph showing a static threshold for a data rate independent of a baseline condition.
Figure 4C:
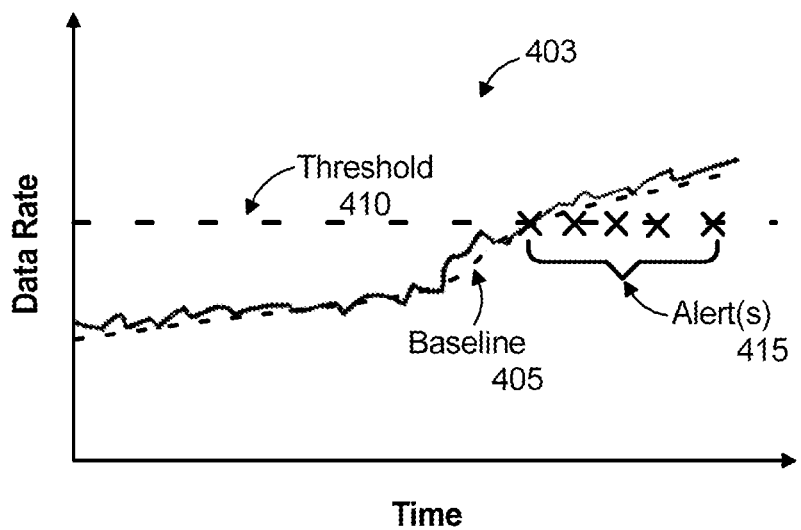
FIG. 4C illustrates a graph that shows one or more alerts, which are triggered once a static threshold is exceeded by a data rate.

FIGS. 4A-4C collectively illustrate graphs showing data rate of one of the nodes within the single managed data object 305. Particularly, FIG. 4A illustrates a graph 401 showing a data rate (e.g., bits/second, bytes/second, packets/second, etc.) as a function of time. As discussed above, profiles that establish baseline conditions are dynamic and are adjusted constantly and automatically over time as network conditions change. As shown in graph 401, the data rate increase, as does a baseline 405 (shown as a dashed line).

FIG. 4B illustrates a graph 402 showing a static threshold 410 for the data rate independent of the baseline condition 405. While the baseline 405 dynamically adjusts to network conditions over time, static threshold 410 remains constant so as to detect previously evasive network threats that slowly increase traffic or network data rates over time thereby incrementally adjusting corresponding baseline 405. Notably, the data rate is shown as increasing over time with single threshold 410, however multiple thresholds can be employed to provide granular alerts based on an extent the data rate exceeds a particular data rate, as is appreciated by those skilled in the art. Conversely, one or more thresholds can be employed to trigger alerts when data rates decrease over time.

FIG. 4C illustrates a graph 403 showing one or more alerts 415, which are triggered once the static threshold 410 is exceeded by the data rate. Notably, static threshold 410 can be set for the single managed group such that each network interface of each node is configured with its own alert. That is, graph 403 illustratively shows a threshold 410 and corresponding alert(s) 415 for a particular network interface of the single managed object 305. Such threshold 410 and corresponding alert(s) 415 are set for each interface of each node of the single managed object 305 (in the aggregate).

FIGS. 4A-4C illustrate a logical progression of the forced alert process 244, employed in network 100. In particular, forced alert process 244, when executed by a node, causes the node to determine a data rate capacity of one or more nodes of a communication network. For example, the node can be programmed to determine the data rate capacity automatically or simply receive a user input specifying the data rate capacity. The node further creates the single managed object grouping (i.e., single managed object 305) for each node of the one or more nodes having a same alert criteria—here, a same data rate capacity. Again, the node can be programmed to automatically create the single managed object grouping or the node can receive a specified managed object grouping from a user input. Once the single managed grouping is established, the node further establishes one or more static thresholds 410 for the single managed object 305 based on the data rate capacity. Notably, the data rate capacity can be measured as a bit or byte per second, a packet per second, etc. The data rate capacity can also represent a percentage of the total capacity of respective nodes of the grouping. Further, the static threshold is independent of a baseline condition of detected data rates to prevent threat detection evasion. The node further detects a current rate of received data at each node of the single managed grouping and triggers at least one alert (for each node) when the current rate of the received data exceeds the static threshold. Notably, the node executing forced alert process 244 can be one of the nodes in the managed object grouping, or it can be a distinct node outside the managed object grouping. In addition, the node can adjust the static threshold 410 after one or more alerts 415 are triggered (e.g., in response to a user input).

In some embodiments, the node can further perform a threat mitigation protocol when the alert is triggered, which can include, but is not limited to re-routing data packets, quarantining particular node(s), etc.

In certain other embodiments, the node can compare the current rate of the received data at each node of the single managed grouping to at least one of the one or more static thresholds to yield a difference rate and assign a severity to each alert based on the difference rate. For example, the node can assign a greater severity to alerts when the data rate exceeds the threshold. Likewise, the node can determine a time period the current rate of the received data exceeds the static threshold(s) and also assign a severity to the corresponding alert based on the time period.

Figure 5A:
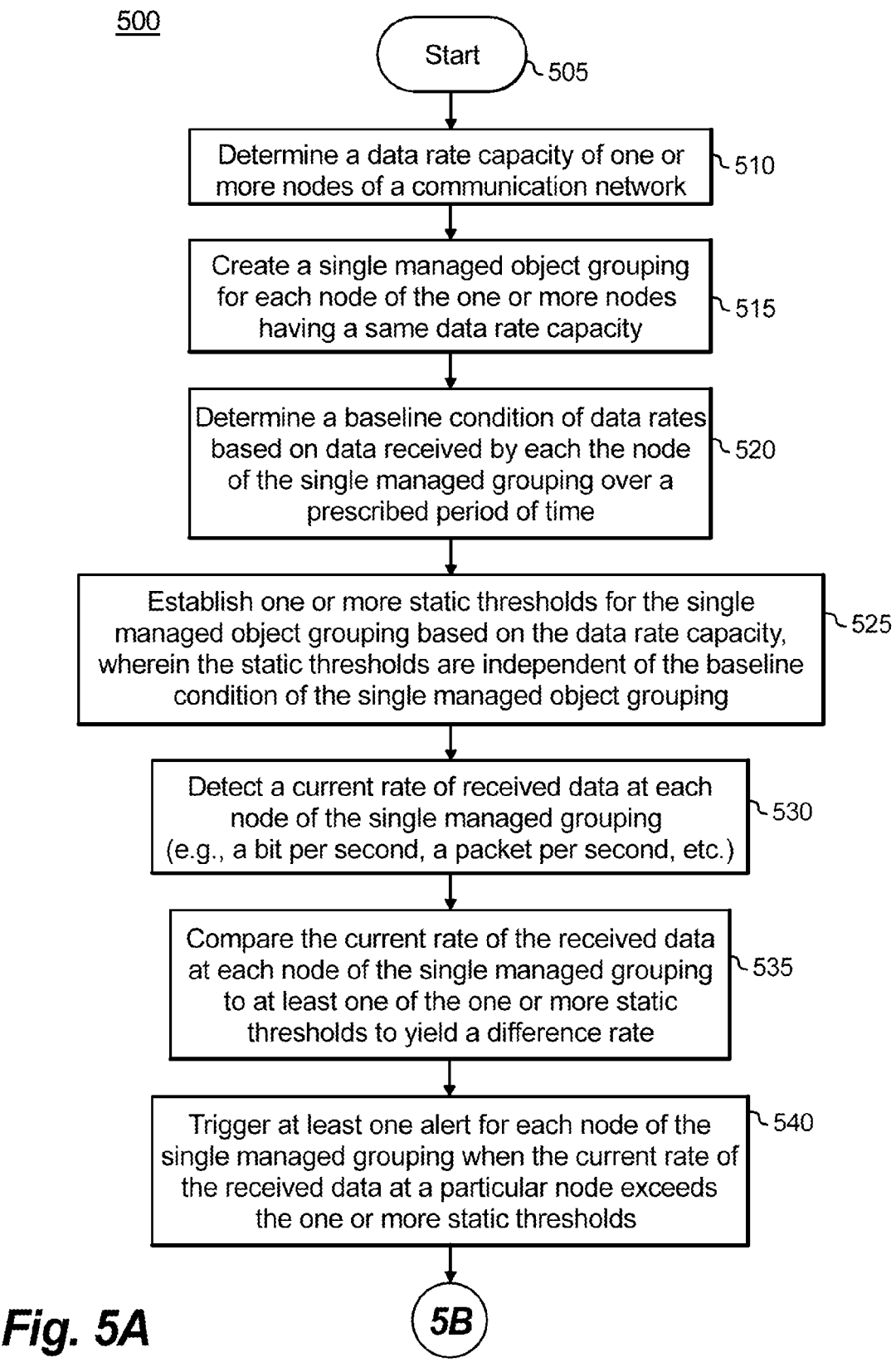
FIGS. 5A-5B illustrates an example simplified procedure for forced alert detection, according to one or more embodiments discussed herein.
Figure 5B:
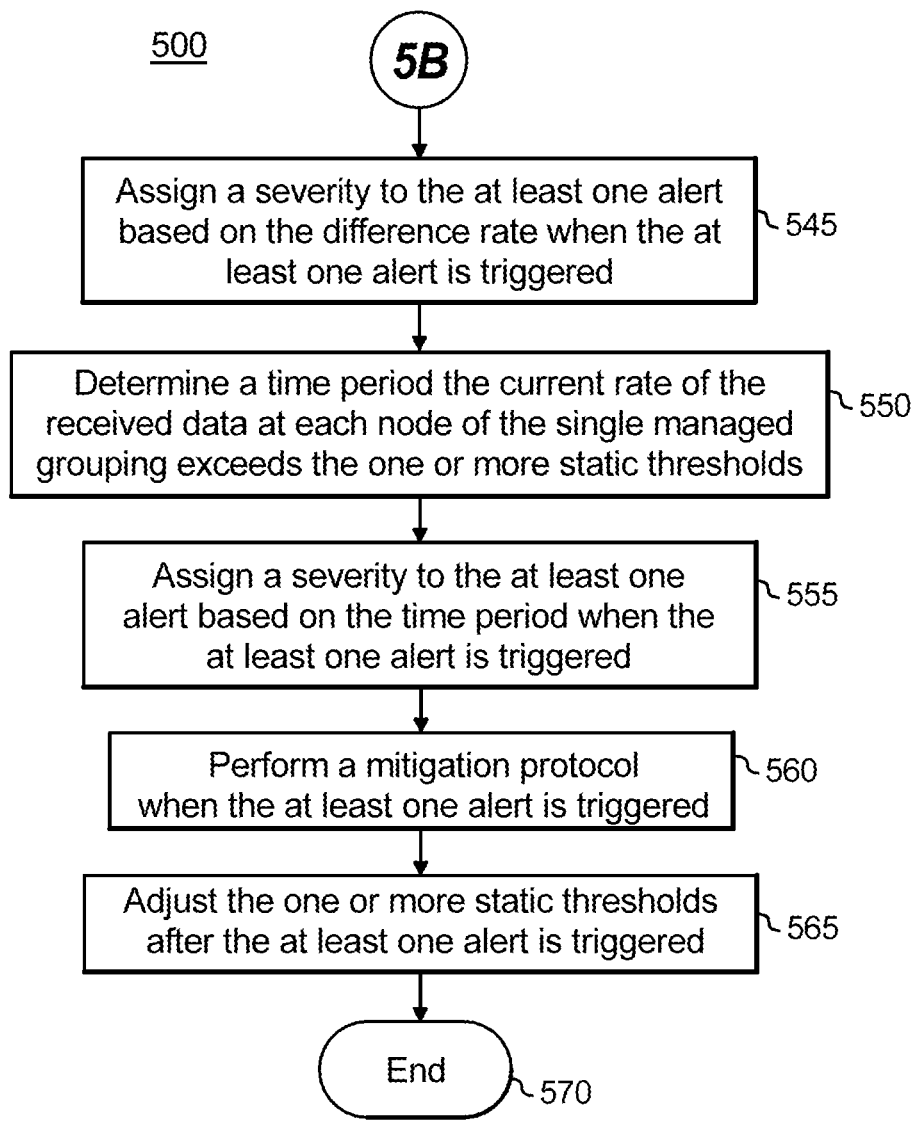

FIGS. 5A-5B illustrates an example simplified procedure 500 for forced alert detection, particularly from the perspective of a node in communication network 100, in accordance with one or more embodiments described herein.

Procedure 500 begins at step 505 and continues to step 510, where as described above, a node determines data rate capacity of one or more nodes of a communication network. Next, in step 515, the node creates a single managed object grouping for each node of the one or more nodes having a same alert criteria—here, a same data rate capacity. As described above, the node can create a single managed object group in response to a user input or command. The node further determines, in step 520, a baseline condition of data rates based on data received by each node of the single managed grouping over a prescribed period of time. In order to protect against evasive network attacks that incrementally adjust a baseline condition, the node establishes, in step 525 one or more static thresholds for the single managed object grouping based on the data rate capacity. Such static thresholds, as discussed above, are preferably independent of the baseline condition detected data rates at each node of the single managed object grouping. Once established, the node further detects, in step 530, a current rate of received data at each node (e.g., at each interface) of the single managed grouping (e.g., a bit per second, a packet per second, etc.). Optionally, in step 535, the node compares the current rate of the received data at each node of the single managed grouping to at least one of the one or more static thresholds to yield a difference rate. Next, in step 540, the node triggers at least one alert for each node (e.g., for each network interface) of the single managed grouping when the current rate of the received data at a particular node exceeds the one or more static thresholds. A severity can optionally be assigned to each alert based on the difference rate when the at least one alert is triggered, as shown in step 545. In some embodiments, the node also determines (step 550) a time period the current rate of the received data at each node of the single managed grouping exceeds the one or more static thresholds, and in step 555, the node assigns a severity to the at least one alert based on the time period, when the at least one alert is triggered. As discussed above, the node in step 560, performs a mitigation protocol (e.g., quarantining compromised nodes, re-routing data, etc.) when the alert is triggered. Further, in step 565, the node can also adjust the static threshold(s) when the alert is triggered. Procedure 500 subsequently ends in step 570, but can subsequently proceed to step 510 where the node determines the data rate capacity of one or more nodes, described above.

It should be noted that certain steps within procedure 500 may be optional and the steps shown in FIG. 5A-5B are merely examples for illustration, and that certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for forced alert thresholds and subsequent alert triggering to mitigate communication network threats. In particular, the techniques herein provide for establishing thresholds independent of baseline conditions so as to avoid otherwise evasive network threats.

While there have been shown and described illustrative embodiments that provide forced threshold alerts, it is to be understood that various other adaptations and modifications may be made within the spirit and scope of the embodiments herein. For example, the embodiments have been shown and described herein with relation to particular nodes grouped in a managed object, however even a single node having multiple network interfaces can be grouped in its own managed object. Further, although the foregoing network threat mitigation techniques have been discussed with respect to bandwidth-based network threats, such techniques can be employed in any suitable network threat mitigation application, as is readily understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising: determining, via a node in a communication network, a data rate capacity of one or more nodes of a communication network; creating, via the node, a single managed object grouping for each node of the one or more nodes having a same data rate capacity; establishing one or more static thresholds for the single managed object grouping based on the data rate capacity, wherein the static thresholds are independent of a baseline condition of detected data rates at each node of the single managed object grouping; detecting a current rate of received data at each node of the single managed grouping; triggering at least one alert for each node of the single managed grouping when the current rate of the received data at a particular node exceeds the one or more static thresholds; determining a time period the current rate of the received data at each node of the single managed grouping exceeds the one or more static thresholds; assigning a severity to the at least one alert based on the determined time period, when the at least one alert is triggered; and adjusting the one or more static thresholds after the at least one alert is triggered; comparing the current rate of the received data at each node of the single managed grouping to at least one of the one or more static thresholds to yield a difference rate; assigning a severity to the at least one alert based on the difference rate when the at least one alert is triggered.

2. The method of claim 1, wherein detecting the current rate of received data at each node of the single managed grouping comprises determining the rate of data received each nod6e based on one of at least a bit per second data rate and a packet per second data rate.

3. The method of claim 1, further comprising: performing a mitigation protocol when the at least one alert is triggered.

4. The method of claim 1, further comprising: determining the baseline condition of detected data rates based on data received by each the node of the single managed grouping over a prescribed period of time.

5. An apparatus, comprising: one or more network interfaces of a node adapted to communicate in a communication network; a processor adapted to execute one or more processes; and a memory configured to store a process executable by the processor, the process when executed operable to: determine a data rate capacity of one or more nodes of the communication network; create a single managed object grouping for each node of the one or more nodes having a same data rate capacity; establish one or more static thresholds for the single managed object grouping based on the data rate capacity, wherein the static thresholds are independent of a baseline condition of detected data rates at each node of the single managed object grouping; detect a current rate of received data at each node of the single managed grouping; trigger at least one alert for each node of the single managed grouping when the current rate of the received data at a particular node exceeds the one or more static thresholds; determine a time period the current rate of the received data at each node of the single managed grouping exceeds the one or more static thresholds; assign a severity to the at least one alert based on the determined time period, when the at least one alert is triggered; and adjust the one or more static thresholds after the at least one alert is triggered; compare the current rate of the received data at each node of the single managed grouping to at least one of the one or more static thresholds to yield a difference rate; assign a severity to the at least one alert based on the difference rate when the at least one alert is triggered.

6. The apparatus of claim 5, wherein the process, when executed by the apparatus to detect the current rate of received data at each node of the single managed grouping, further causes the apparatus to: determine the rate of data received at each node based on one of at least a bit per second data rate and a packet per second data rate.

7. The apparatus of claim 5, wherein the process, when executed by the apparatus, further causes the apparatus to: perform a mitigation protocol when the at least one alert is triggered.

8. The apparatus of claim 5, wherein the process, when executed by the apparatus, further causes the apparatus to: determine the baseline condition of detected data rates based on data received by each the node of the single managed grouping over a prescribed period of time.

9. A tangible, non-transitory, computer-readable media having software encoded thereon, the software, when executed by a processor, operable to: determine a data rate capacity of one or more nodes of the communication network; create a single managed object grouping for each node of the one or more nodes having a same network interface; establish one or more static thresholds for the single managed object grouping based on the network interface, wherein the static thresholds are independent of a baseline condition of detected data rates at each node of the single managed object grouping; detect a current rate of received data at each node of the single managed grouping; trigger at least one alert for each node of the single managed grouping when the current rate of the received data at a particular node exceeds the one or more static thresholds; determine a time period the current rate of the received data at each node of the single managed grouping exceeds the one or more static thresholds; assign a severity to the at least one alert based on the determined time period, when the at least one alert is triggered; and adjust the one or more static thresholds after the at least one alert is triggered; compare the current rate of the received data at each node of the single managed grouping to at least one of the one or more static thresholds to yield a difference rate; and assign a severity to the at least one alert based on the difference rate when the at least one alert is triggered.

10. The media of claim 9, wherein the software, when executed by a processor to detect the current rate of received data at each node of the single managed grouping, further causes the processor to: determine the rate of data received at each node based on one of at least a bit per second data rate and a packet per second data rate.

11. The media of claim 9, wherein the software, when executed by a processor, further causes the processor to: perform a mitigation protocol when the at least one alert is triggered.

12. The media of claim 9, wherein the software, when executed by a processor, further causes the processor to: determine the baseline condition of detected data rates based on data received by each the node of the single managed grouping over a prescribed period of time.

* * * * *